March 4, 1958  R. H. SPELMAN  2,825,383
TUBELESS TIRE
Filed Aug. 10, 1953
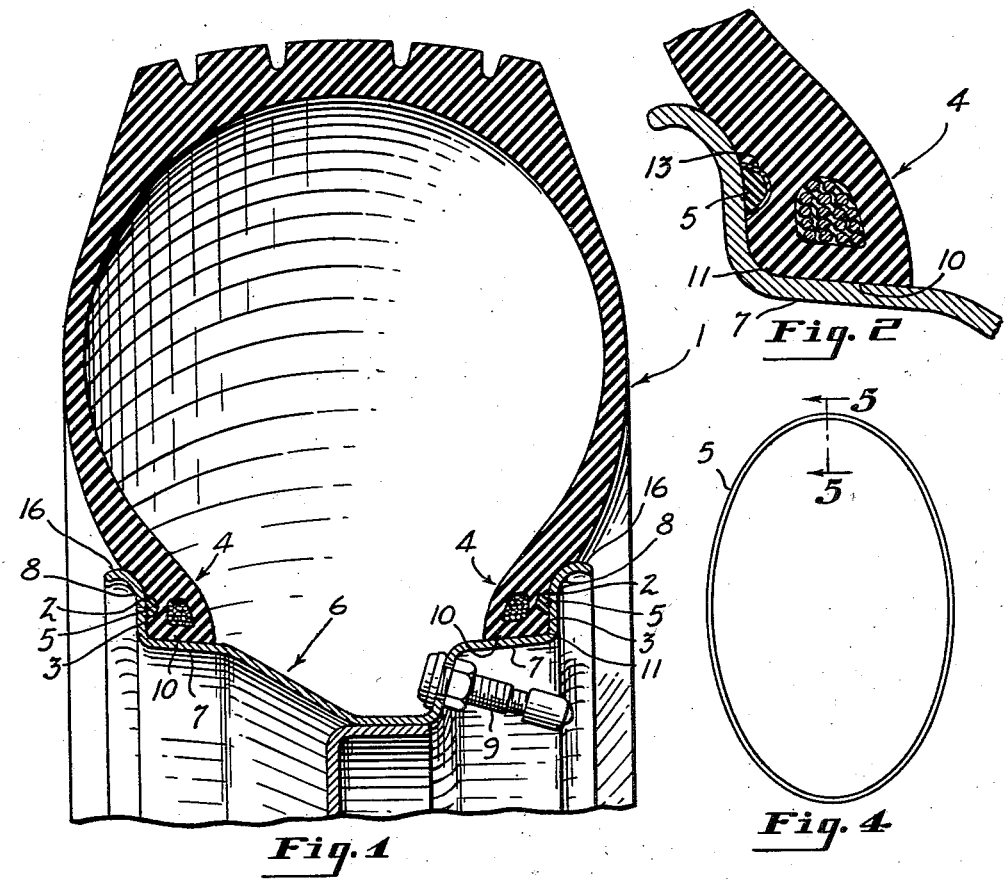
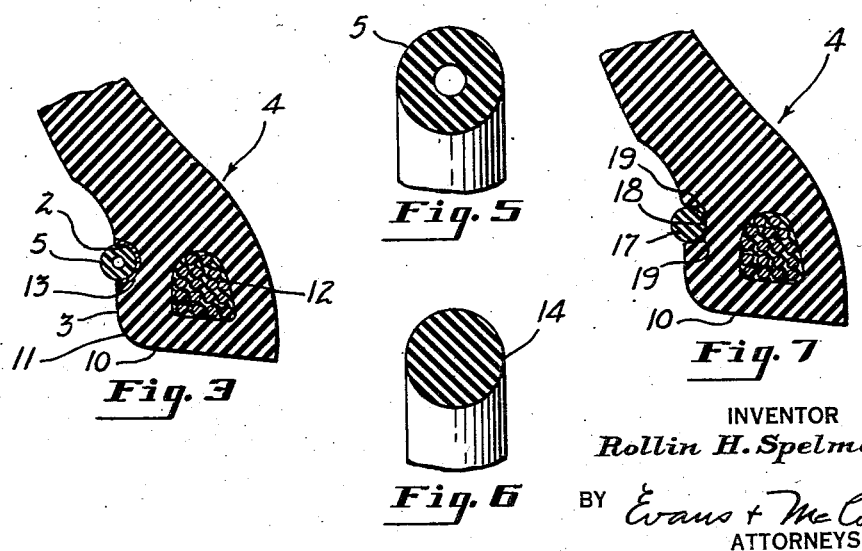
INVENTOR
Rollin H. Spelman
BY Evans + McCoy
ATTORNEYS

United States Patent Office 2,825,383
Patented Mar. 4, 1958

2,825,383

TUBELESS TIRE

Rollin H. Spelman, Akron, Ohio, assignor to The General Tire and Rubber Company, Akron, Ohio, a corporation of Ohio Application August 10, 1953, Serial No. 373,429

7 Claims. (Cl. 152—362)

This invention relates to pneumatic tires and particularly to pneumatic tire casings intended for use without an inner tube, or so called "tubeless tires."

In order to make these tire assemblies air-tight, some sealing means must be provided between the tire bead portions and the tire rim. Many different sealing means have been proposed and tried. Because of the use to which all tires are subjected, there is a certain amount of unavoidable motion between the tire bead portion and the rim but this rocking of the bead should be a minimum for long life of the tire casing. Sometimes the toe of the tire bead portion lifts from its seal on the rim shoulder and sometimes the bead portion sidewall separates from or is not held firmly against the upright, bead-retaining, rim flange. Since this motion cannot be eliminated, bead sealing means must be capable of maintaining a seal throughout it.

Another disadvantage of available bead sealing means for tubeless tires is that they do not ride and give with the unavoidable motion between the tire beads and rim and do not maintain an air-tight seal throughout this motion.

Still another disadvantage of available bead sealing means is that they do not permit the bead portion of the tire to seat firmly on the rim shoulder or against the bead-retaining rim flange so that, as a result, the tire is subject to bead rock.

It is thus one object of this invention to provide sealing means between the tire beads and tire rim which is maintained throughout the unavoidable motion between the tire beads and tire rim, which allows the bead portions to seat firmly on the rim shoulder and against the bead retaining rim flange, and which is inexpensive and easy to install.

Another object of this invention is to provide bead sealing means for tubeless tires and a pneumatic tire combination suitable for use without an inner tube which is readily adapted for use with conventional tire carcass and on conventional straight-side rims.

Still another object is to provide a tire seal integral with a tire which can be readily repaired and replaced without the necessity of destroying the whole tire carcass.

Other objects and advantages will be apparent from the following detailed description and accompanying drawings in which like numerals relate to like parts.

In the drawings,

Figure 1 is a cross-sectional view of a tubeless tire mounted on a conventional drop-center tire rim and provided with rubber O-rings in accordance with this invention;

Fig. 2 is an enlarged view of the O-ring of this invention mounted between the tire bead portion and rim flange;

Fig. 3 is an enlarged view showing an O-ring assembled in a groove in the lower wall of the tire bead portion;

Fig. 4 is a perspective view of a hollow O-ring for use with this invention;

Fig. 5 is a cross-sectional view of the O-ring of Fig. 4 taken along line 5—5 of Fig. 4;

Fig. 6 is a cross-sectional view showing a modified form of O-ring for use with this invention; and Fig. 7 is an enlarged view showing an O-ring assembled in a groove in the lower wall of the tire bead portion, the groove being larger than necessary to provide clearance between the O-ring and the tire bead portion.

In accordance with this invention, I provide an air-tight tire casing 1 having grooves 2 in the outside wall 3 of the bead portions 4. A rubber O-ring 5 is disposed in the grooves as shown in Fig. 3. The tire bead portions, with the O-rings in the grooves, are then squeezed together and placed over the center of the rim 6. The tire is inflated and the bead portions expand outward over the rim shoulders into the assembled position with the bottom 10 of the bead portions resting on the rib rim shoulders 7 and the wall 3 of the bead portions resting against the upright rim flanges or walls 8.

Air pressure forces the bead portions flush against the tire rim walls and presses the O-ring against the tire rim walls to effect an air-tight seal. It is preferable to over inflate the tire in order to ensure proper seating of the beads with the rim and then release pressure as necessary.

The O-ring provides an absolutely air-tight seal between the tire rim and bead wall or outside bead portion as shown in Figs. 1 and 2. When sealed and in place, the ring distorts and slightly collapses so as to spread out and be flat against the upright or substantially vertical, bead-retaining flange 8 of the rim shoulder at the side of the rim. This allows substantially the whole wall of the bead portion to be firmly seated against the bead-retaining flange 8, provides a large and effective sealing area between the tire bead portion and tire rim, and prevents air leakage even when the rim and casing are subjected to relative motion. In this way, this invention allows for limited motion of the tire beads and rim without breaking the seal and at the same time is simple, inexpensive, and easily serviced. It also eliminates bead rock or any tendency of the wall of the bead portion to pivot about the O-ring.

Rims for use in accordance with this present invention can be any conventional drop center rim provided the rim wall has a relatively regular, smooth surface. It is preferable to coat the inside of the rim with a sealant of some sort such as an air-tight paint or rubber cement to prevent air leakage and seepage out through the pores of the metal. Any conventional air inlet means or inflation means such as valve 9 may be used. The valve is preferably mounted in the bottom of the rim so as to be readily accessible.

The continuous circumferential grooves or cavities 2 in the wall of the bead portion are preferably molded into the tire.

The center of the groove should be located so as to position the O-ring against the flat, substantially upright portion of the rim wall. It should be above the rounded corner of the bead portion 11 and below the rounded shoulder portion 16 of the flange 8 of the tire rim. This generally works out so that the center of the groove has approximately the same radius as the radius of the center of the wire bead ring 12 or the median radius of the groove is within the innermost and outermost radius of the wire bead ring 12. In other terms, the center of the groove should be from one-fifth to three-fifths of the way up the vertical rim flange height. The cross-section of the groove should preferably be of greater width than depth for receiving the O-ring and holding it in place.

Generally only one groove should be formed in the tire bead portion, but if desired, two or more grooves and two or more O-rings may be employed.

The rubber O-ring or rubber sealing bead is preferably cemented into the groove with rubber cement or other adhesive compound 13 so as to make it stick to and be integral with the tire casing. At the same time, care should be taken to minimize the amount of cement used so that a damaged or worn out ring is readily removed and replaced without the necessity of digging out or otherwise removing excess rubber cement.

The O-ring itself should be of a high quality rubber which is preferably of treadstock quality in regard to resistance to abrasion and preferably of approximately the hardness of treadstock. It preferably should be from 50 to 70 durometer and have a modulus from 900 to 1500 p. s. i. at 300 percent elongation. Any of the natural or synthetic rubbers or rubbery copolymer mixtures are used for this purpose.

In this way, the O-ring can be made integral with the tire and of a different and more satisfactory hardness and modulus so as to provide a superior sealing action. When one O-ring becomes damaged or worn out or loses its resiliency, it is readily removed and replaced with another ring without scrapping the tire casing.

The ring should be endless as shown in Fig. 4 and may be solid or hollow. The hollow ring 5 is found to be preferable for the reason that it more readily collapses against the rim wall to form a seal. The rubber of the hollow ring may be of the same hardness and flexibility as the tread rubber or it may be softer and more flexible as found desirable for the particular purpose by experimentation and testing. Fig. 6 shows a cross-sectional view of a solid ring 14. Obviously, the cross-sectional shape of the O-ring may be varied from that shown in Figs. 5 and 6 and may be oval or of any other suitable shape.

When a solid O-ring is used, it should preferably be softer and more plastic than the rubber of the tire bead portion or tire tread. Should a solid ring be used, its groove should be larger than necessary to provide clearance. This is illustrated in Fig. 7 in which an O-ring 17 is disposed in a groove 18 with clearance 19. In such a case, the clearance between the O-ring and bead portion wall permits the O-ring to expand into the groove and permits the bead wall to fit flat against the bead-retaining rim flange. The clearance is preferably provided by rounding the outer corners of the groove and squaring the inner corners of the groove so that the O-ring is initially supported over a limited area at the sides and at the bottom only and has sufficient clearance in the groove to permit the side face of the bead to seat firmly against the bead flange of the rim upon inflation of the casing.

The diameter of the ring section should be from approximately one-eighth up to three-quarters or more of the sectional diameter of the wire tire bead. A ring satisfactorily used with passenger car tires was approximately three-sixteenths of an inch in diameter.

The tire casings used with the present invention can be any of the air-tight, tubeless tire casings now available. This includes various butyl lined tire casings, butyl lined casings with sealant, ordinary casings painted on the inside with a sealing cement and other air-tight tire casings.

It is to be understood that in accordance with the provisions of the patent statutes, variations and modifications of the invention herein shown and described may be made without departing from the spirit of the invention.

Having thus described my invention, what I claim is:

1. In a wheel having an annular straight-side drop-center rim with coaxial generally cylindrical axially-extending bead-engaging portions and axially-aligned annular bead-engaging flanges integral with and extending radially outwardly from said axially-extending portions, an improved inflatable tubeless pneumatic rubber tire comprising: a vulcanized toric-shaped fabric-reinforced casing having tread and side wall portions and annular beads at its opposite ends shaped to conform to the shape of the bead-engaging surfaces of said rim, each bead having a central inextensible wire bead ring and a single annular groove in its rim-flange-engaging face with a width greater than its depth, the median radius of said groove being within the innermost and outermost radii of the wire bead ring, the rim-engaging surfaces of the bead being smoothly curved from the margins of said groove to their marginal edges so as to conform substantially to the shape of said rim when the tire is mounted on the rim, and a vulcanized elastic rubber ring mounted in each groove, said ring having a normal cross section with a diameter greater than the depth of said groove so as to project axially beyond said rim-engaging surfaces and having a cross sectional area not materially greater than that of said groove so that the ring may be compressed to conform to the shape of the adjacent rim flange.

2. In a wheel having an annular straight-side drop-center rim with coaxial generally cylindrical axially-extending bead-engaging portions and axially-aligned annular bead-engaging flanges integral with and extending radially outwardly from said axially-extending portions, an improved tubeless pneumatic rubber tire comprising: a vulcanized toric-shaped fabric-reinforced casing having tread and side wall portions and annular beads at its opposite ends shaped to conform to the shape of the bead-engaging surfaces of said rim, each bead having a central inextensible wire bead ring and a single annular groove in its rim-flange-engaging face with a width greater than its depth, the median radius of said groove being within the innermost and outermost radii of the wire bead ring, and a pair of vulcanized elastic rubber O-rings mounted in and bonded to the grooves of said beads for engaging said rim flanges, each ring having a normal diameter substantially greater than the depth of its associated groove, said rings being of a softer and more flexible rubber than the rubber of the tire tread portion and being flattened against the surface of the rim flange when the tire is inflated so that the beads are firmly supported on said cylindrical rim portions and engage said rim flanges to provide an air-tight seal.

3. The combination of claim 2 wherein the rubber O-rings are hollow throughout their circumference.

4. The combination of claim 2 wherein the rubber O-rings are generally circular in cross section and said grooves are substantially rectangular in cross section so that a clearance is provided between each ring and its associated groove to receive portions of the ring when the tire is inflated to compress the ring.

5. A pneumatic tire adapted to be mounted on a rim provided with bead retaining side flanges, said tire comprising a tread portion, bead portions, and sidewall portions interconnecting said tread and bead portions, said bead portions having integral axially outer surfaces each containing an axially open annular groove extending in depth substantially axially of said tire, and an annular, deformable, elastomeric, resilient sealing element movably mounted in and only partially filling each said groove and partially extending therebeyond for engagement with and compression by said side flanges, whereby the sealing elements are adapted to form a fluid tight seal with the rim.

6. A pneumatic tire as defined in claim 5 wherein each sealing element is in the form of a hollow ring and is cemented in its associated groove.

7. A pneumatic tire as defined in claim 5 wherein each sealing element is in the form of a solid ring, a clearance being provided between each sealing element and its associated groove to permit compressing of the sealing element into the groove.

(References on following page)

References Cited in the file of this patent

UNITED STATES PATENTS

| | | |
|---|---|---|
| 2,409,666 | Comey | Oct. 22, 1946 |
| 2,563,787 | Keefe | Aug. 7, 1951 |
| 2,587,470 | Herzegh | Feb. 26, 1952 |
| 2,608,235 | Wyman | Aug. 26, 1952 |
| 2,709,472 | Hofweber | May 31, 1955 |

FOREIGN PATENTS

| | | |
|---|---|---|
| 305,533 | Great Britain | Oct. 10, 1929 |
| 686,145 | Great Britain | Jan. 21, 1953 |